United States Patent
Mater, Jr. et al.

(10) Patent No.: US 9,333,827 B2
(45) Date of Patent: May 10, 2016

(54) SHOCK ABSORBER MOUNTING ASSEMBLY FOR LEAF SPRING SUSPENSION TRAILERS

(71) Applicant: Stalwart Design & Development LLC, Elkhart, IN (US)

(72) Inventors: Robert F. Mater, Jr., Elkhart, IN (US); Auldreg R. Dismuke, Elkhart, IN (US)

(73) Assignee: STALWART DESIGN & DEVELOPMENT LLC, Elkhart, IN (US)

( * ) Notice: Subject to any disclaimer, the term of this patent is extended or adjusted under 35 U.S.C. 154(b) by 0 days.

(21) Appl. No.: 14/604,216

(22) Filed: Jan. 23, 2015

(65) Prior Publication Data

US 2015/0210135 A1 Jul. 30, 2015

Related U.S. Application Data (60) Provisional application No. 61/931,272, filed on Jan. 24, 2014.

(51) Int. Cl.
*B60G 11/02* (2006.01)
*B60G 11/113* (2006.01)
*B60G 13/00* (2006.01)

(52) U.S. Cl.
CPC .............. *B60G 13/005* (2013.01); *B60G 11/02* (2013.01); *B60G 11/113* (2013.01); *B60G 13/003* (2013.01); *B60G 2202/11* (2013.01); *B60G 2204/128* (2013.01); *B60G 2204/129* (2013.01); *Y10T 29/49716* (2015.01)

(58) Field of Classification Search
CPC .. B60G 15/066; B60G 15/067; B60G 13/003; B60G 13/005; B60G 11/02; B60G 11/04; B60G 11/113; B60G 2202/11; B60G 2202/112; B60G 2204/121; B60G 2204/129

USPC ............... 280/86.75, 124.17; 267/52, 31
See application file for complete search history.

(56) References Cited

U.S. PATENT DOCUMENTS

| | | | | |
|---|---|---|---|---|
| 1,901,287 | A * | 3/1933 | Corriveau | B60G 15/06 267/52 |
| 3,090,611 | A | 5/1963 | Schultze | |
| 3,532,334 | A | 10/1970 | Mays | |
| 3,721,457 | A | 3/1973 | Tracy et al. | |
| 4,168,844 | A * | 9/1979 | Smith | B60G 15/06 280/124.104 |
| 4,533,157 | A * | 8/1985 | Hoenle | B60G 9/00 267/229 |
| 5,230,528 | A * | 7/1993 | Van Raden | B62D 61/12 280/124.116 |
| 5,636,857 | A * | 6/1997 | Tandy, Jr. | B60G 9/00 267/31 |
| 6,102,417 | A | 8/2000 | Moore | |
| 6,428,025 | B1 | 8/2002 | Suh | |
| 6,676,160 | B2 | 1/2004 | Stanley | |
| 7,192,033 | B2 | 3/2007 | Bolt et al. | |
| 8,172,237 | B2 | 5/2012 | Peterson | |
| 8,177,246 | B2 * | 5/2012 | Cortez | B60G 11/113 280/124.175 |
| 2002/0030340 | A1 * | 3/2002 | Suh | B60G 9/003 280/124.106 |
| 2013/0049319 | A1 * | 2/2013 | Ryshavy | B60G 11/10 280/124.175 |

* cited by examiner

*Primary Examiner* — Ruth Ilan
(74) *Attorney, Agent, or Firm* — King & Schickli, PLLC (57) ABSTRACT

A shock absorber mounting assembly is provided for a trailer incorporating a leaf spring suspension. That mounting assembly includes a first shock absorber mounting bracket secured to a frame of the trailer and a second shock absorber mounting bracket secured to an axle of the trailer. The second shock absorber mounting bracket includes of tie plate, an elongated shock absorber mounting lug extending from the tie plate and an adjustable suspension alignment feature.

17 Claims, 7 Drawing Sheets

SHOCK ABSORBER MOUNTING ASSEMBLY FOR LEAF SPRING SUSPENSION TRAILERS

This document claims the benefit of U.S. provisional patent application Ser. No. 61/931,272, filed on 24 Jan. 2014, the full disclosure of which is incorporated herein by reference.

TECHNICAL FIELD

This document relates generally to the trailer equipment field and, more particularly, to a shock absorber mounting assembly for leaf spring suspension trailers that provides control of trailer rebound from roadway imperfections and incorporates suspension alignment capability.

BACKGROUND

Controlling vehicle rebound from roadway imperfections is a cardinal objective of ride control engineers. Very few RVs and cargo trailers with conventional spring suspension are equipped to control rebound.

The main reason RV shock absorber use is limited is because of shock mounting geometry problems. Conventional suspensions lack space to adequately place a hydraulic shock in an effective operation position. Shocks operate optimally in an upright position. Unfortunately, there is not enough room in current suspension designs to place a shock of adequate control length and diameter to allow vertical operation.

Some spring suspensions are equipped with tie plates that will accept the lower shock mount. The problem is availability of an effective spot to position the upper shock fastener. A further complication to this very popular design configuration is the underslung spring orientation. When the axle is placed under the spring, the tie plate (lower shock mount location) can be as much as 3 inches higher (closer) to the optimum upper shock mount location. Size does matter in shock absorber efficiency.

The more a shock is angled to the direction of the force acting on it, the less effective it is. Vertical to the force, it is 100 percent effective, 45 degrees to the force, 50 percent effective, 90 degrees to the force, 0 percent effective. Most shocks are calibrated to be run at 15 to 20 degrees from vertical.

This document relates to a new and improved shock absorber mounting assembly for leaf spring suspension trailers that addresses and resolves these issues.

SUMMARY

In accordance with the purposes and benefits described herein, a shock absorber mounting assembly is provided for a trailer incorporating a leaf spring suspension. That assembly comprises a first shock absorber mounting bracket secured to the frame of the trailer and a second shock absorber mounting bracket secured to an axle of the trailer. The second shock absorber mounting bracket includes a tie plate, an elongated shock absorber mounting lug extending from the tie plate and an adjustable suspension alignment feature.

The adjustable suspension alignment feature includes an adjustment gear and a gear receptacle on the tie plate for receiving and holding the adjustment gear in a plurality of different adjusted position. More specifically, the gear receptacle comprises an elongated opening in the tie plate. That elongated opening includes two opposed sidewalls. The two opposed sidewalls include a first set of gear teeth.

The adjustment gear includes two opposed edges including a second set of gear teeth that mesh with the first set of gear teeth to hold the adjustment gear in the gear receptacle in any one of the plurality of adjustment positions thereby allowing fore/aft adjustment of one end of the axle relative to the frame of the trailer to correct axle alignment relative to the frame.

In one possible embodiment, the shock absorber mounting assembly further includes a lock plate abutting the tie plate and the adjustment gear in the gear receptacle. The lock plate includes an elongated slot and four mounting apertures. The adjustment gear includes a mounting aperture aligned with the elongated slot. A leaf spring mounting bolt extends through the mounting aperture in the adjustment gear and the elongated slot in the lock plate into a receiving aperture in the leaf spring.

In one possible embodiment, the assembly further includes two U-bolts received through the four mounting apertures in the lock plate and cooperating aligned apertures in the tie plate. The U-bolts extend around an axle of the trailer and are held in place by cooperating tightening nuts and lock washers.

In one possible embodiment, the elongated shock absorber mounting lug has at least two shock mounting holes to allow for adjustability in shock mounting. In one possible embodiment, the assembly further includes an extension lug that is secured to the elongated shock absorber mounting lug in order to extend the elongated shock absorber mounting lug. The extension lug includes at least four holes, including two holes used to secure the extension lug to the elongated shock absorber mounting lug and two holes to allow for adjustability in shock mounting. Further the assembly includes a shock absorber having a first end secured to the first shock absorber mounting bracket at a first mounting point and a second end secured to the second shock absorber mounting bracket at a second mounting point.

In one possible embodiment, that second mounting point is provided at a vertical position located between the axle and a lowermost point of a rim of a wheel on the axle of the trailer. In one possible embodiment, the shock absorber mounted between the first and second mounting points is laterally canted with respect to a vertical axis so as to allow the shock absorber to resist trailer sway. More specifically, the lateral cant with respect to the vertical axis is between about 10 and about 20°. In one possible embodiment, the elongated shock absorber mounting lug and the tie plate form an angle of about 105° so that the shock absorber is tilted at an angle of approximately 15° toward the midline of the vehicle to which it is mounted from a first mounting point to the second point.

In accordance with an additional aspect, a method is provided for correcting suspension alignment of a trailer incorporating a leaf spring suspension and controlling rebound from roadway imperfections. That method may be broadly described as comprising the steps of securing a first shock absorber mounting bracket to a frame of the trailer, adjusting a position of an adjustment gear in a second shock absorber mounting bracket, securing the shock absorber mounting bracket to an axle of the trailer through the adjustment gear and connecting a shock absorber between a first mounting point on the first shock absorber mounting bracket and a second mounting point on the second shock absorber mounting bracket. In one possible embodiment, that method may further include providing an extension lug that is secured to the elongated lug in order to extend the elongated lug and thereby provide a longer span between the first mounting point and the second point necessary to accommodate a longer shock absorber while maintaining the shock absorber at a better operating angle relative to the frame and the axle of the trailer for more efficient rebound control.

In the following description, there are shown and described several preferred embodiments of the shock absorber mounting assembly. As it should be realized, the assembly is capable of other, different embodiments and its several details are capable of modification in various, obvious aspects all without departing from the assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the shock absorber mounting assembly and together with the description serve to explain certain principles thereof. In the drawing figures.

Reference will now be made in detail to the present preferred embodiments of the shock absorber mounting assembly, examples of which are illustrated in the accompanying drawing figures.

DETAILED DESCRIPTION

Reference is now made to FIGS. 1-6 illustrating the shock absorber mounting assembly 10. The shock absorber mounting assembly 10 may be utilized on single, tandem and triple axle trailers incorporating a leaf spring suspension in order to correct suspension alignment and control rebound from roadway imperfections. It should be appreciated that one shock absorber mounting assembly 10 is positioned at the end of each trailer axle. Further, it should be appreciated that the assembly 10 may be used whether or not the axle is carried above the leaf spring or below the leaf spring.

Figure 1:
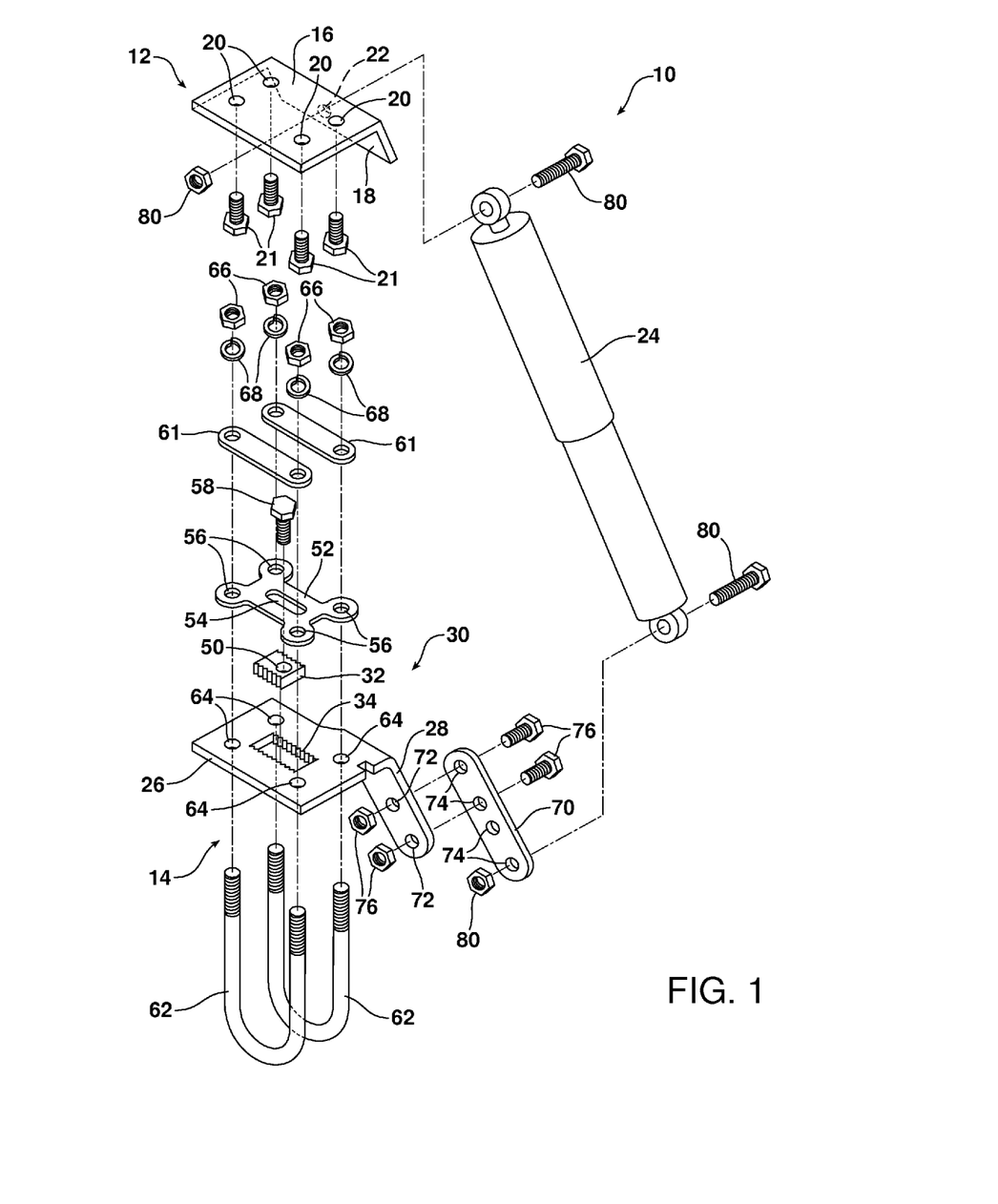
FIG. 1 is an exploded perspective view of the shock absorber mounting assembly.

As illustrated in FIG. 1, the shock absorber mounting assembly 10 includes a first shock absorber mounting bracket 12 that is secured to a frame F of the trailer T and a second shock absorber mounting bracket 14 that is secured to an axle A of the trailer. In the illustrated embodiment the first shock absorber mounting bracket 12 includes a base leg 16 and a shock absorber mounting flange 18. In the illustrated embodiment, the base leg 16 includes a series of apertures 20 that may be utilized to mount the first mounting bracket 12 to the frame F of the trailer utilizing bolts 21 and lock nuts (not shown). In an alternative embodiment the first mounting bracket 12 may simply be welded to the frame F or connected by some other appropriate means. As illustrated, the mounting flange 18 includes an aperture 22 that serves as a first mounting point $P_1$ for a shock absorber 24 as will be described in greater detail below. In the illustrated embodiment, only one aperture 22 is provided in the flange 18. In other alternative embodiments, more than one aperture 22 may be provided so that an operator can use either aperture as desired for the first mounting point in order to obtain the best operation geometry for the shock absorber 24.

The second shock absorber mounting bracket 14 includes a body that includes a tie plate 26, an elongated shock absorber mounting lug 28 extending from the tie plate and an adjustable suspension alignment feature, generally designated by reference numeral 30.

Figure 2:
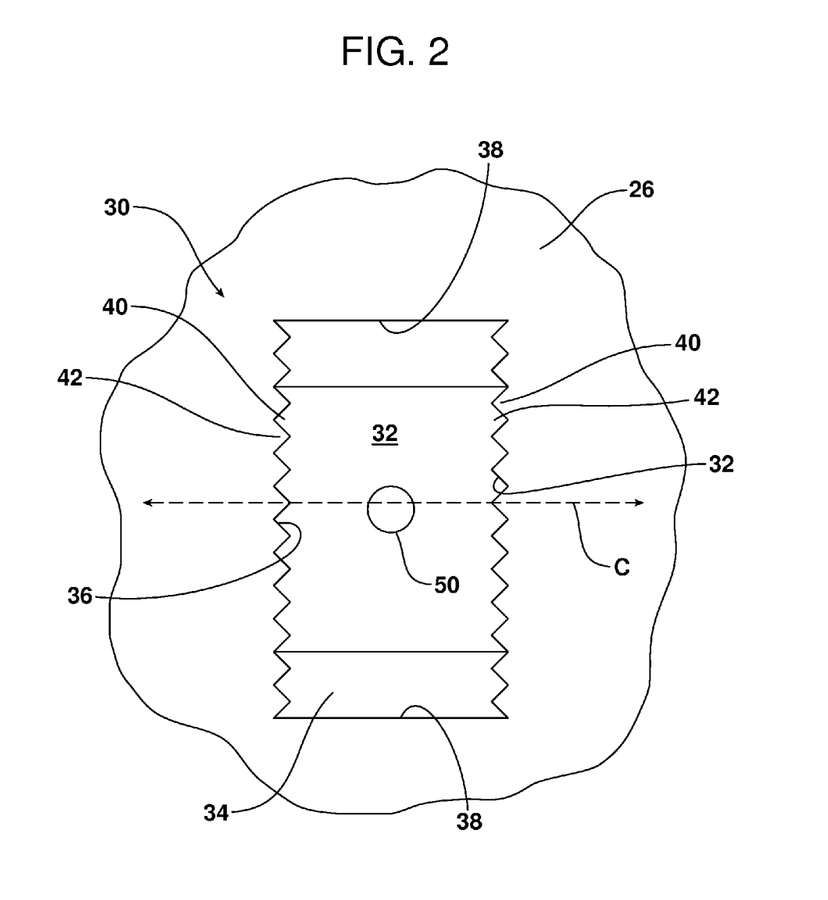
FIG. 2 is a detailed perspective view illustrating the tie plate, the gear receptacle in the tie plate and the adjustment gear held in the gear receptacle of the tie plate.
Figure 3:
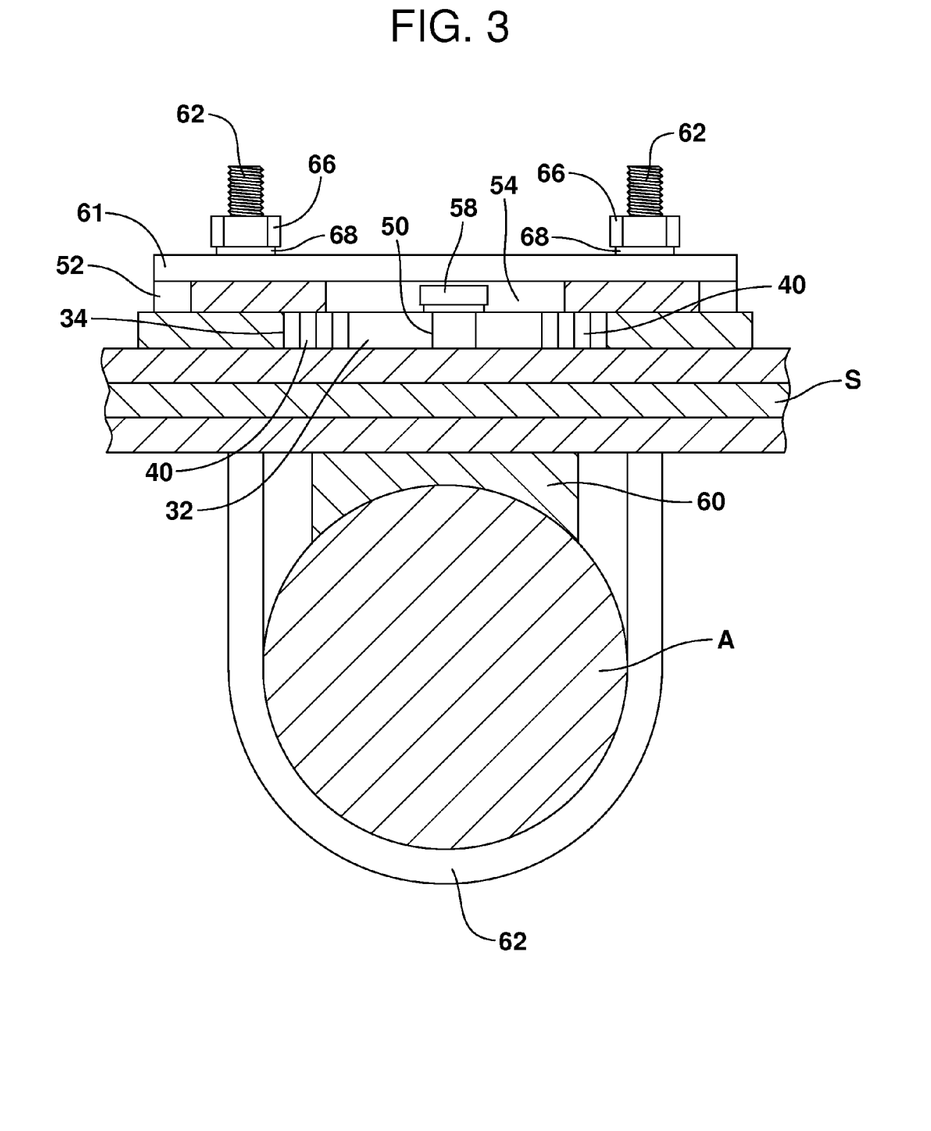
FIG. 3 is a cross sectional view illustrating the connection of the second shock absorber mounting bracket to the leaf spring and axle of a trailer.

As best illustrated in FIGS. 1 and 2, the adjustable suspension alignment feature 30 includes an adjustment gear 32 and a gear receptacle 34 in the tie plate 26 for receiving and holding the adjustment gear in a plurality of different adjustment positions. As illustrated, the gear receptacle 34 comprises an elongated opening in the form of a rectangle having two opposed sidewalls 36 and two opposed end walls 38. As illustrated, the opposed sidewalls 36 comprise a first set of gear teeth 40.

As further illustrated in FIGS. 1 and 2, the adjustment gear 32 comprises a rectangular plate that includes two opposed edges 42 comprising a second set of gear teeth that mesh with the first set of gear teeth to hold the adjustment gear 32 in the gear receptacle 34 in any one of a plurality of adjustment positions thereby allowing fore/aft adjustment of one end of the axle A relative to the frame F of the trailer T as necessary to correct axle alignment relative to the frame. This is a particularly important consideration in trailers T having unequal weight distribution over the left hand and right hand wheel sets.

More specifically, it should be appreciated that the length of the adjustment gear from the first end 46 to the second end 48 is less than the length of the distance between the end walls 38 of the receptacle 34. Thus, the position of the gear 32 within the receptacle 34 between the end walls 38 may be adjusted in a fore/aft direction relative to the trailer frame F. The cooperating gear teeth 40, 44 are sized and spaced to allow adjustment in ¼ inch/0.635 cm increments. Significantly, a mounting aperture 50 is provided in the adjustment gear 32. This axle mounting aperture 50 is ⅛ inch or 0.3175 cm off the centerline C between the ends 46, 48 of the gear 32. Thus, it is possible to adjust for suspension alignment down to ⅛ inch or 0.3175 cm graduations simply by flipping the adjustment gear over 180° about its centerline C.

As further illustrated in FIG. 1, the assembly 10 also includes a lock plate 52 having an elongated slot 54 and four mounting apertures 56. When the assembly 10 is properly secured to the axle A of the vehicle, a leaf spring mounting bolt 58 extends through the elongated slot 54 in the lock plate 52, the mounting aperture 50 in the adjustment gear 32 and engages in a threaded hole in the leaf spring S. Two U-bolts 62 complete the connection. The U-bolts 62 are received through the four mounting apertures 56 in the lock plate 52 and cooperating, aligned apertures 64 in the tie plate 26. As best illustrated in FIGS. 3-6, the U-bolts 62 extend around the leaf spring S of the trailer T and are held in place by cooperating tightening nuts 66 and lock washer 68. An axle shoe 60 between the leaf spring S and the axle A insures proper seating of the axle. In addition, stiffeners 61 across the U-bolts 62 further strengthen the connection.

In the illustrated embodiment, the shock absorber mounting assembly 10 also includes an extension lug 70 that may be secured to the elongated shock absorber mounting lug 28 in order to extend that lug 28. More specifically, the elongated shock absorber mounting lug 28 includes two apertures 72 while the extension lug 70 includes four holes 74: with two of those holes used to secure the extension lug 72 to the lug 28 by cooperating bolts and lock nuts 76 and the other two holes acting as the second mounting point for the shock absorber 24. Either by the other holes 74 may be utilized as desired in order to provide the best operating angle for the shock absorber 24. In the illustrated embodiment, the second mounting point $P_2$ for the shock absorber 24 is provided at a vertical position located between the axle A and the lowermost point of a rim R of a wheel W on the axle of the trailer.

Figure 5:
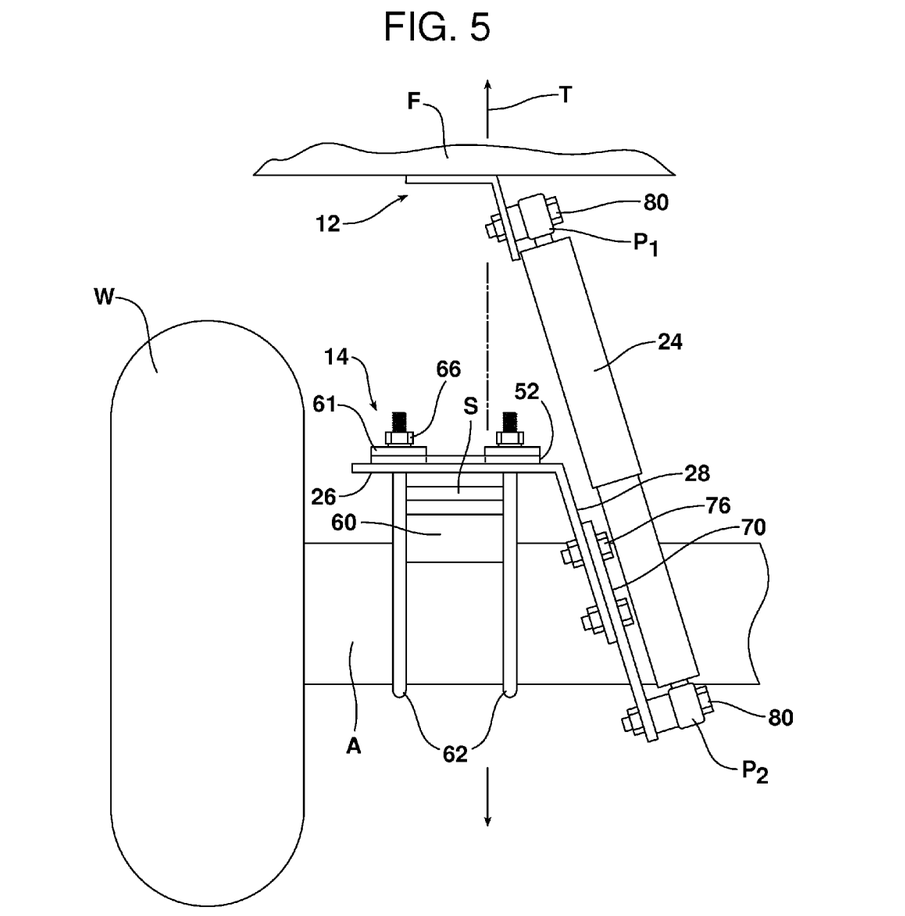
FIG. 5 is a rear elevational view of the mounting assembly as on actuator as illustrated in FIG. 4.
Figure 7:
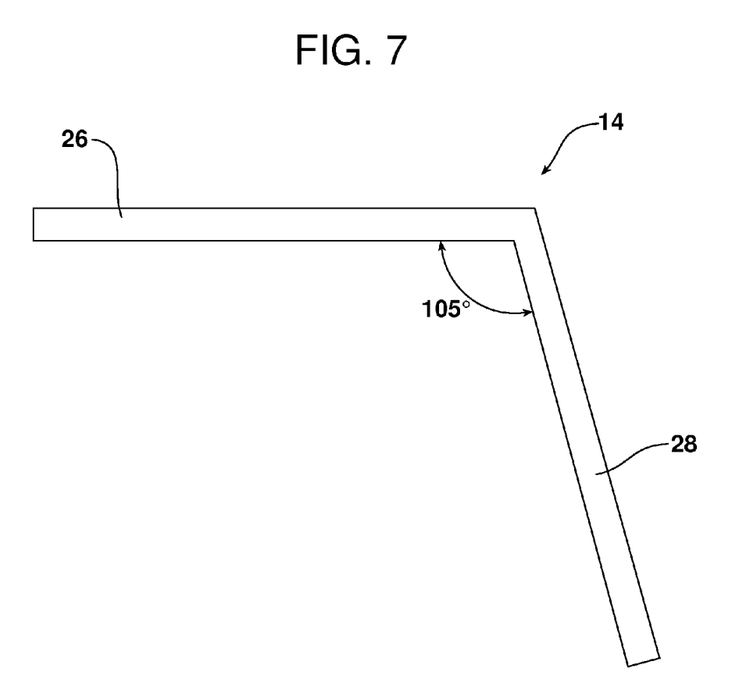
FIG. 7 is an end elevational view illustrating the second shock absorbing mounting bracket showing the angle of the elongated shock absorber mounting lug with respect to the tie plate.

As best illustrated in FIG. 5, the shock absorber 24 is mounted between the first and second mounting points $P_1$, $P_2$ with cooperating nuts and bolts 80 so as to be laterally canted inward from top to bottom toward the centerline of the vehicle V with respective vertical axis T so as to allow the shock absorber 24 to resist trailer sway. In one possible embodiment, that lateral canting of the shock absorber 24 with respective vertical axis X is between about 10 and 20°. In one particularly useful embodiment, that canting is at an angle of about 15°. To achieve this end second shock absorber mounting bracket 14 forms an included angle of about 105° between the tie plate 26 and the depending lug 28. See FIG. 7

Figure 4:
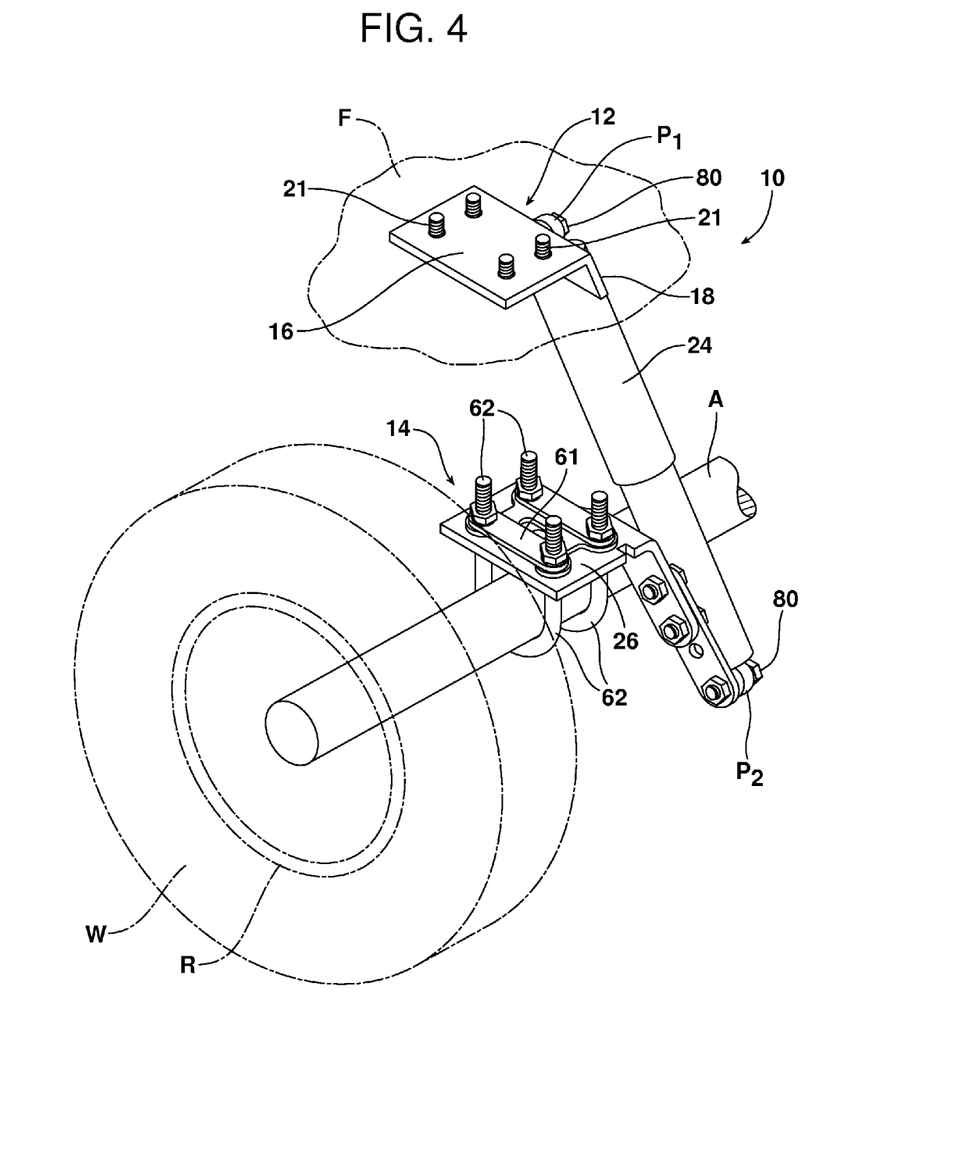
FIG. 4 is a perspective view illustrating how the shock absorber mounting assembly is connected to the frame and axle at one side of a trailer incorporating a leaf spring suspension.
Figure 6:
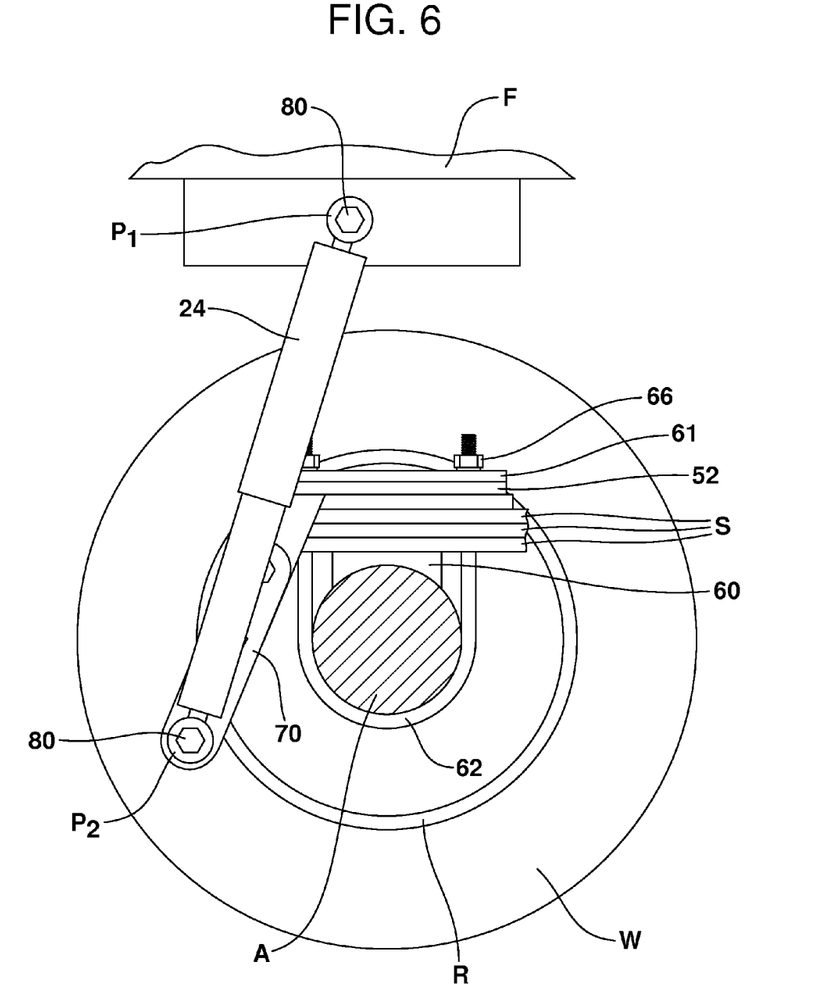
FIG. 6 is an interior side elevational view of the assembly of FIGS. 4 and 5 connected to a trailer.

FIGS. 4-6 illustrate the shock absorber mounting assembly 10 properly secured to the trailer T so that the geometry of the shock absorber 24 extending between mounting point $P_1$ and mounting point $P_2$ is suited to provide the best possible damping of trailer rebound from roadway imperfections as well as sway control. Further, the adjustment gear 32 has been positioned in the gear receptacle 34 so as to correct for any misalignment in the suspension that may have been caused by uneven trailer weighting or for other reasons. By correcting such misalignment, tire wear is significantly reduced and fuel economy is increased. Thus, it should be appreciated that this document also describes a method of correcting suspension alignment and controlling rebound from roadway imperfections for a trailer T incorporating a leaf spring suspension. This method that be broadly described as comprising the step of securing a first shock absorber mounting bracket 12 to a frame F of the trailer T in the manner described above. Further, the method includes adjusting the position of the adjustment gear 32 in the gear receptacle 34 of the tie plate 26 to correct for any suspension misalignment in the manner described above. In addition, the method includes a step of securing the second shock absorber mounting bracket 12 to the axle A of the trailer in the manner previously described.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A shock absorber mounting assembly for a trailer incorporating a leaf spring suspension comprising:
    a first shock absorber mounting bracket secured to a frame of said trailer;
    a second shock absorber mounting bracket secured to an axle of said trailer, said second shock absorber mounting bracket including a tie plate, an elongated shock absorber mounting lug depending from said tie plate and an adjustable suspension alignment feature; wherein said adjustable suspension alignment feature includes an adjustment gear and a gear receptacle in said tie plate for receiving and holding said adjustment gear in a plurality of different adjustment positions.

2. The assembly of claim 1, wherein said gear receptacle includes an elongated opening in said tie plate, said elongated opening including two opposed sidewalls, said two opposed sidewalls including a first set of gear teeth.

3. The assembly of claim 2, wherein said adjustment gear includes two opposed edges including a second set of gear teeth that mesh with said first set of gear teeth to hold said adjustment gear in said gear receptacle in any one of said plurality of adjustment positions thereby allowing fore/aft adjustment of one end of said axle relative to said frame of said trailer to correct axle alignment relative to said frame.

4. The assembly of claim 3, further including a lock plate abutting said tie plate and said adjustment gear in said gear receptacle.

5. The assembly of claim 4, wherein said lock plate includes an elongated slot and four mounting apertures and said adjustment gear includes a mounting aperture aligned with said elongated slot.

6. The assembly of claim 5, further including a leaf spring mounting bolt extending through said mounting aperture in said adjustment gear and said elongated slot in said lock plate into a receiving aperture in said leaf spring.

7. The assembly of claim 6, further including two U-bolts received through said four mounting apertures in said lock plate and cooperating, aligned apertures in said tie plate, said U-bolts extending around an axle of said trailer and held in place by cooperating tightening nuts and lock washers.

8. The assembly of claim 7, wherein said elongated shock absorber mounting lug has at least two shock mounting holes to allow for adjustability in shock mounting.

9. The assembly of claim 8, further including an extension lug secured to said elongated shock absorber mounting lug in order to extend said elongated shock absorber mounting lug.

10. The assembly of claim 9, wherein said extension lug includes at least four holes, including two holes used to secure said extension lug to said elongated shock absorber mounting lug and two holes to allow for adjustability in shock mounting.

11. The assembly of claim 10, further including a shock absorber having a first end secured to said first shock absorber mounting bracket at a first mounting point and a second end secured to said second shock absorber mounting bracket at a second point.

12. The assembly of claim 11, wherein said second mounting point is provided at a vertical position located between said axle and a lowermost point of a rim of a wheel on the axle of the trailer.

13. The assembly of claim 12, wherein said shock absorber mounted between said first and second mounting points is laterally canted with respect to a vertical axis so as to allow said shock absorber to resist trailer sway.

14. The assembly of claim 13, wherein said lateral canting with respect to the vertical axis is between about 10 and about 20 degrees.

15. The assembly of claim 13, wherein said lateral canting with respect to the vertical axis is about 15 degrees and said elongated shock absorber mounting lug and said tie plate form an angle of about 105 degrees.

16. A method of correcting suspension alignment of a trailer incorporating a leaf spring suspension and controlling rebound from roadway imperfections, comprising:

securing a first shock absorber mounting bracket to a frame of the trailer;

adjusting a position of an adjustment gear located in a gear receptacle in a second shock absorber mounting bracket;

securing said second shock absorber mounting bracket to an axle of the trailer through the adjustment gear; and connecting a shock absorber between a first mounting point on said first shock absorber mounting bracket and a second mounting point on an elongated lug depending from said second shock absorber mounting bracket.

17. The method of claim 16, further including providing an extension lug that is secured to said elongated lug in order to extend said elongated lug and allow a longer span between said first mounting point and said second mounting point necessary to accommodate a longer shock absorber while maintaining said shock absorber at a better operating angle relative to the frame and the axle for more efficient rebound control.

\* \* \* \* \*